(12) United States Patent
Bourdon

(10) Patent No.: US 11,305,682 B2
(45) Date of Patent: Apr. 19, 2022

(54) REPOSITIONABLE DECK DEVICE FOR A STRUCTURE

(71) Applicant: Jonathan Bourdon, Holton, KS (US)

(72) Inventor: Jonathan Bourdon, Holton, KS (US)

(*) Notice: Subject to any disclaimer, the term of this patent is extended or adjusted under 35 U.S.C. 154(b) by 80 days.

(21) Appl. No.: 16/859,120

(22) Filed: Apr. 27, 2020

(65) Prior Publication Data
US 2021/0129731 A1    May 6, 2021

Related U.S. Application Data

(60) Provisional application No. 62/931,273, filed on Nov. 6, 2019.

(51) Int. Cl.
*B60P 3/34* (2006.01)
*E04B 1/00* (2006.01)

(52) U.S. Cl.
CPC ................. *B60P 3/34* (2013.01); *E04B 1/003* (2013.01)

(58) Field of Classification Search
CPC .................................. B60P 3/34; E04B 1/003
USPC .................................. 296/162; 52/79.5, 79.6
See application file for complete search history.

(56) References Cited

U.S. PATENT DOCUMENTS

| 3,392,990 | A | * | 7/1968 | Wolf | B60R 3/02 |
| | | | | | 280/163 |
| 3,598,441 | A | * | 8/1971 | Damiani | B60P 3/34 |
| | | | | | 296/164 |
| 3,941,414 | A | * | 3/1976 | Platt | B60P 3/34 |
| | | | | | 296/170 |
| 4,355,834 | A | * | 10/1982 | Alford | B60P 3/34 |
| | | | | | 296/163 |
| 5,154,469 | A | * | 10/1992 | Morrow | B60P 3/34 |
| | | | | | 296/171 |
| 5,639,139 | A | * | 6/1997 | Rush | B60P 3/025 |
| | | | | | 280/763.1 |
| 5,658,032 | A | * | 8/1997 | Gardner | B60P 3/34 |
| | | | | | 296/175 |
| 6,502,893 | B1 | * | 1/2003 | Corliss, Jr. | B60P 3/34 |
| | | | | | 296/162 |
| 7,093,888 | B2 | * | 8/2006 | Anderson | B60P 3/36 |
| | | | | | 296/162 |
| 7,410,205 | B2 | * | 8/2008 | Cardwell | B60P 3/36 |
| | | | | | 296/162 |
| 7,686,381 | B1 | * | 3/2010 | Leonard | B60P 3/343 |
| | | | | | 296/162 |
| 2007/0102946 | A1 | * | 5/2007 | Blackwell | A61G 3/001 |
| | | | | | 296/24.38 |

(Continued)

*Primary Examiner* — Gregory A Blankenship
(74) *Attorney, Agent, or Firm* — Brennan, Manna & Diamond, LLC

(57) ABSTRACT

The present invention relates to a repositionable deck system for a camper, RV, mobile home, trailer or the like, that is comprised of a frame, decking fixedly attached to said frame, legs for supporting the frame above a ground surface, one or more shock absorbers for positioning between the decking and the side of the camper to prevent damage to either surface during travel, a plurality of spring assisted hinges for attaching the deck component to the side of the camper, wherein the plurality of spring assisted hinges permit the decking component to be repositioned between a deployed position and a stowed position with minimal effort, and a locking mechanism for locking the deck component to the side of the camper when the repositionable deck system is in the stowed position.

16 Claims, 3 Drawing Sheets

(56) References Cited

U.S. PATENT DOCUMENTS

| | | | |
|---|---|---|---|
| 2008/0296922 A1* | 12/2008 | Diamond | B60P 3/34 296/26.13 |
| 2009/0217600 A1* | 9/2009 | De Azambuja | B65D 90/0006 52/79.5 |
| 2010/0269419 A1* | 10/2010 | Gyory | E04B 1/34384 52/79.5 |
| 2012/0153667 A1* | 6/2012 | Raber | B60P 3/34 296/162 |
| 2013/0154296 A1* | 6/2013 | Blackwell | A61G 10/00 296/24.38 |
| 2017/0089057 A1* | 3/2017 | Burns | E04B 5/02 |
| 2018/0022262 A1* | 1/2018 | Roth | E04F 15/02 296/162 |
| 2018/0050627 A1* | 2/2018 | Requejo | B60P 3/34 |
| 2018/0319310 A1* | 11/2018 | Zhou | H04N 5/23238 |
| 2019/0118696 A1* | 4/2019 | McGregor | B62D 63/061 |
| 2019/0270364 A1* | 9/2019 | Roth | B60P 3/34 |
| 2020/0017014 A1* | 1/2020 | Lopez | B60P 3/34 |
| 2021/0129731 A1* | 5/2021 | Bourdon | B60P 3/34 |

* cited by examiner

REPOSITIONABLE DECK DEVICE FOR A STRUCTURE

CROSS-REFERENCE TO RELATED APPLICATION

The present application claims priority to and the benefit of U.S. Provisional Application No. 62/931,273 filed on Nov. 6, 2019, which is incorporated herein by reference in its entirety.

BACKGROUND

The present invention relates to a repositionable deck or other planar surface that may be attached to and stowed along the side of a camper, mobile home, trailer or the like. More specifically, the deck is easily repositionable between a stowed and a deployed position, and is hingedly and securely attached to the side of the camper, mobile home, trailer, etc. and may further comprise a ramp for each access to and from the deck surface. Accordingly, the present specification makes specific reference thereto. However, it is to be appreciated that aspects of the present invention are also equally amenable to other like applications, devices and methods of manufacture.

In the U.S. alone, millions and millions of people enjoy camping and related recreational activities such as hiking, canoeing, fishing, hunting, and the like. Oftentimes camping and other outdoor enthusiasts will use a camper, mobile home, trailer, etc., as opposed to a tent, for temporary housing and as a base for their outdoor operation. Unfortunately, parking situations in the great outdoors are not always ideal. For example, mud, uneven and rough terrain may make it difficult for the user to set up their chairs/towels and other items adjacent to their camper, RV, mobile home, trailer or the like, and to fully enjoy their camping experience.

Additionally, it is oftentimes not practical or convenient to transport a deck or other planar surface to a campground or other remote location to enjoy next to a camper. Likewise, it is also not convenient, practical or time or cost efficient to construct a temporary deck or other planar surface for a relatively short duration or camping excursion. Therefore, many campers and outdoor enthusiasts much forgo the same and make the best of the less than ideal terrain surrounding the camper to set up camp.

Further, many campers, RVs, mobile homes, trailers and the like further comprise some type of repositionable awning that extends outwardly from the top and side of the camper to provide shade, and to protect the outdoor enthusiast from other elements, such as rain, snow, sleet, etc. while still being able to enjoy the outdoor experience and fresh air. Such awning systems typically require some form of post structure that extends between the cantilevered awning portion and the ground to support the awning. Unfortunately, without a relatively level or dry ground surface to receive the awning posts, which may be difficult to locate in a campground or other remote setting, a camping enthusiast may not be able to deploy the vehicle's awning system and, therefore, may not have overhead protection from the elements or harmful ultraviolet rays from the sun.

Therefore, there exists in the art a long felt need for a stable deck or other planar surface that is repositionably attached to the side of a camper, RV, mobile home, trailer or the like, and that can be easily transported to and from a campground or other remote location. There is also a long felt need in the art for a stable deck or other planar surface that can be easily deployed, and that keeps campers and other outdoor enthusiasts and their belongings off of the ground and out of the mud. There is also a long felt need in the art for a repositionable deck or other planar surface that is handicap accessible, and that is capable of supporting an overhead awning system. Finally, there is a long felt need in the art for a repositionable deck that can be made to a customer's specifications to accommodate the customer's desired style and needs, that does not require the use of tools or additional hardware to deploy and that is relatively safe and easy to use.

The present invention, in one exemplary embodiment, discloses a repositionable deck system for a camper, RV, mobile home, trailer or the like, that is comprised of a frame, decking fixedly attached to said frame, legs for supporting the frame above a ground surface, one or more shock absorbers for positioning between the decking and the side of the camper to prevent damage to either surface during travel, a plurality of spring assisted hinges for attaching the deck component to the side of the camper, wherein the plurality of spring assisted hinges permit the decking component to be repositioned between a deployed position and a stowed position and further wherein the spring assisted hinges permit the user to do so with minimal effort, and a locking mechanism for locking the deck component to the side of the camper when the repositionable deck system is in the stowed position.

In this manner, the repositionable deck device of the present invention accomplishes all of the forgoing objectives, thereby vastly improving the camping experience for the user. In a further preferred embodiment of the present invention, the repositionable deck device may further comprise a foldable or collapsible ramp component to make the deck device handicap or pet accessible, and/or pockets or other openings to securely accommodate posts or other supports for the camper's awning system.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a repositionable deck device for attachment to the side of a recreational vehicle such as a camper, mobile home, trailer or the like to provide a user with an elevated planar surface for enjoying the outdoors, setting up camp adjacent to the recreational vehicle and, in a further preferred embodiment, supporting an awning structure associated with the recreational vehicle and providing easy handicap and pet access thereto.

The recreational vehicle deck device is preferably comprised of a frame comprised of a plurality of spaced apart longitudinal frame members attached to one another by a plurality of spaced apart lateral frame members via fasteners, and decking fixedly attached to said frame. The deck device is further comprised of a plurality of adjustable and telescoping legs for supporting the frame and associated decking on an uneven ground surface so that the surface of the decking is relatively flat and is not leaning in a particular direction, and one or more shock absorbers attached to the side of the recreational vehicle and positioned between the decking and the recreational vehicle when the device is in the stowed position to prevent damage to either from the vibrations associate with movement of the recreational vehicle.

The recreational vehicle deck device is further comprised of a plurality of spring assisted hinges for attaching the deck component to the side of the recreational vehicle, wherein the plurality of spring assisted hinges permits the decking component to be repositioned between a deployed position and the stowed position and further wherein the spring assisted hinges permit the user to do so with minimal effort despite the weight of the decking, and a locking mechanism comprised of deck clips for locking the deck component to the side of the recreational vehicle when the repositionable deck system is in the stowed position. More specifically, once the deck component is repositioned into the stowed position, the deck clips attached thereto snap into openings in the vibration or shock absorbers mounted along the side of the recreational vehicle, and can be locked to prevent unwanted or premature release.

As mentioned above, in a further preferred embodiment of the present invention, the repositionable deck system may further comprise a ramp assembly for providing relatively easy access to the deck surface and the recreational vehicle, and a means of supporting the awning system of the recreational vehicle. More specifically, the ramp may be hingedly and/or releasably attached to a side surface of the deck component so that it can be folded adjacent thereto or removed when not in use. Further, the means for supporting the awning system of the recreational vehicle may be one or more pockets or openings in the decking component for receipt of a beam or other support of the awning system.

In this manner, the repositionable deck device of the present invention accomplishes all of the forgoing objectives, thereby vastly improving the camping experience for the user. To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
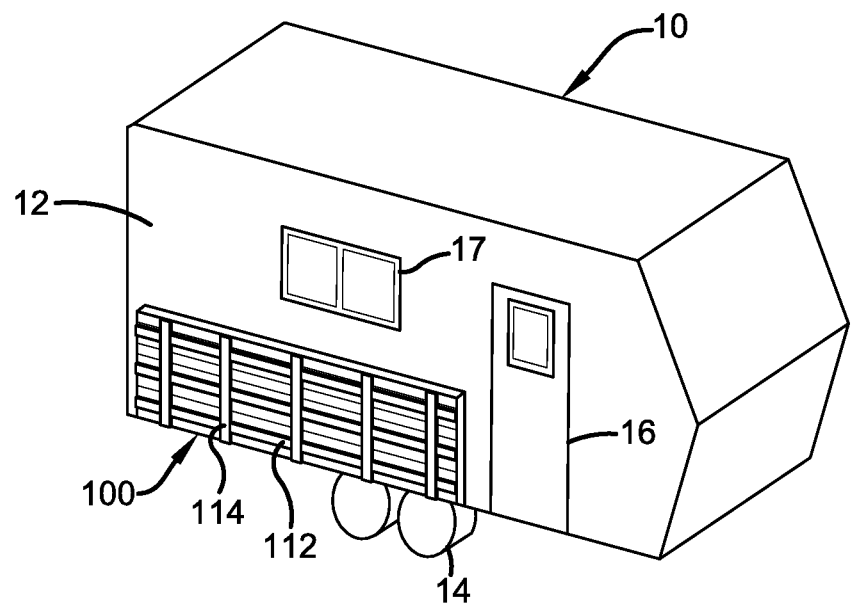
FIG. 1 illustrates a perspective view of one possible embodiment of the repositionable deck device of the present invention in a stowed position and repositionably and hingedly attached the side of a prior art camper in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there is a long felt need in the art for a level and stable deck or other planar surface that is repositionably attached to the side of a camper, RV, mobile home, trailer or the like, and that can be easily transported to and from a campground or other remote location with minimal effort. There also exists a long felt need in the art for a deck device that can be easily deployed, and that can keep campers and other outdoor enthusiasts and their belongings off of the ground. Further, there exists a need in the art for a repositionable deck that is both handicap accessible, and that is capable of supporting an overhead awning system. Finally, there is a long felt need in the art for a repositionable deck that is spring assisted, does not require the use of tools or additional hardware to deploy, and that is relatively safe and easy for a user to use.

Referring initially to the drawings, FIG. 1 illustrates a perspective view of one possible embodiment of the repositionable deck device 100 of the present invention in a stowed position and repositionably and hingedly attached the side of a prior art camper 10 in accordance with the disclosed architecture. More specifically, camper 10 may be any prior art recreational type vehicle or stationary housing unit such as a camper, trailer, mobile home or the like, and is typically comprised of a side panel 12, tires 14, a door 16, a window 17, a retractable awning 18 repositionably attached to the side panel 12 or a top surface of the camper 10 and a pair of awning posts or other supports 19 for supporting the cantilevered portion of the awning 18 when it is deployed.

In a preferred embodiment of the present invention, repositionable deck device 100 is comprised of a frame 110, decking 120 fixedly attached to said frame 110, one or more legs 130 also fixedly attached to said frame 110 and extending downwardly therefrom to reach a ground surface (not shown) for supporting said deck device 100, one or more absorber assemblies 140 preferably attached to the side panel 12 of camper 10, one or more spring loaded hinges 150 attached to each of repositionable deck device 100 and the side panel 12 of camper 10, and a plurality of fasteners 170 for fixedly or removable attaching one or more of the above referenced elements.

Figure 2:
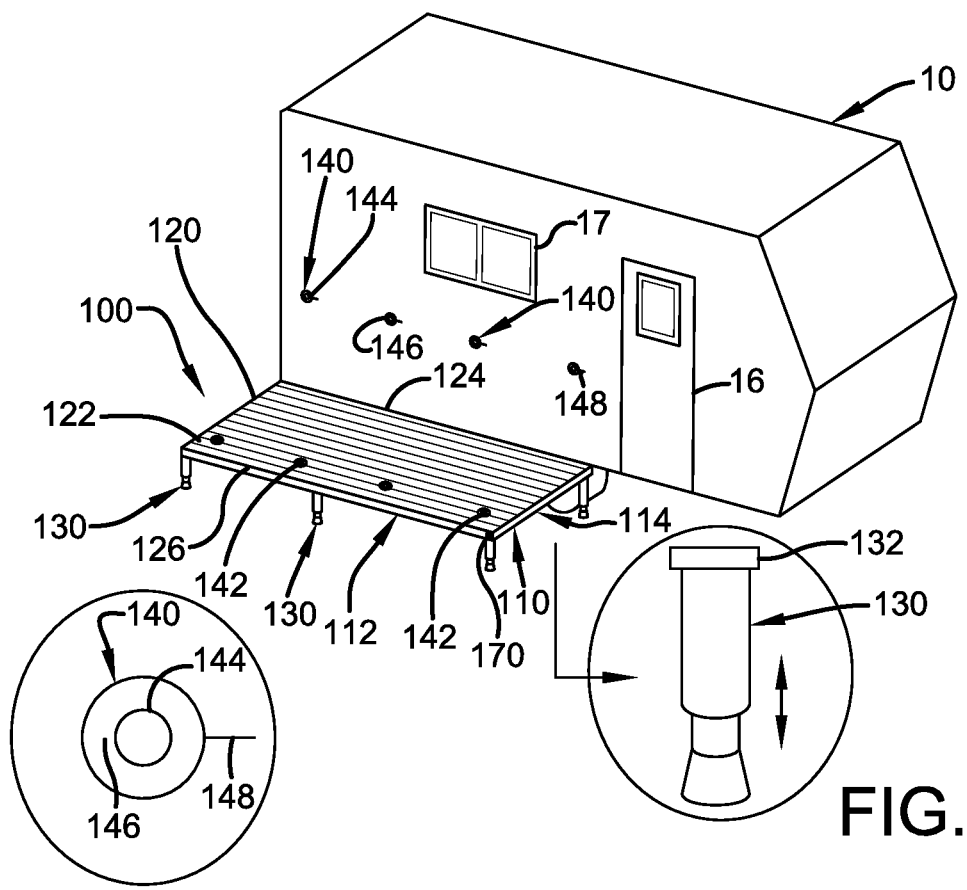
FIG. 2 illustrates a perspective view of one possible embodiment of the repositionable deck device of the present invention in a deployed position and repositionably and hingedly attached the side of a prior art camper in accordance with the disclosed architecture.
Figure 3:
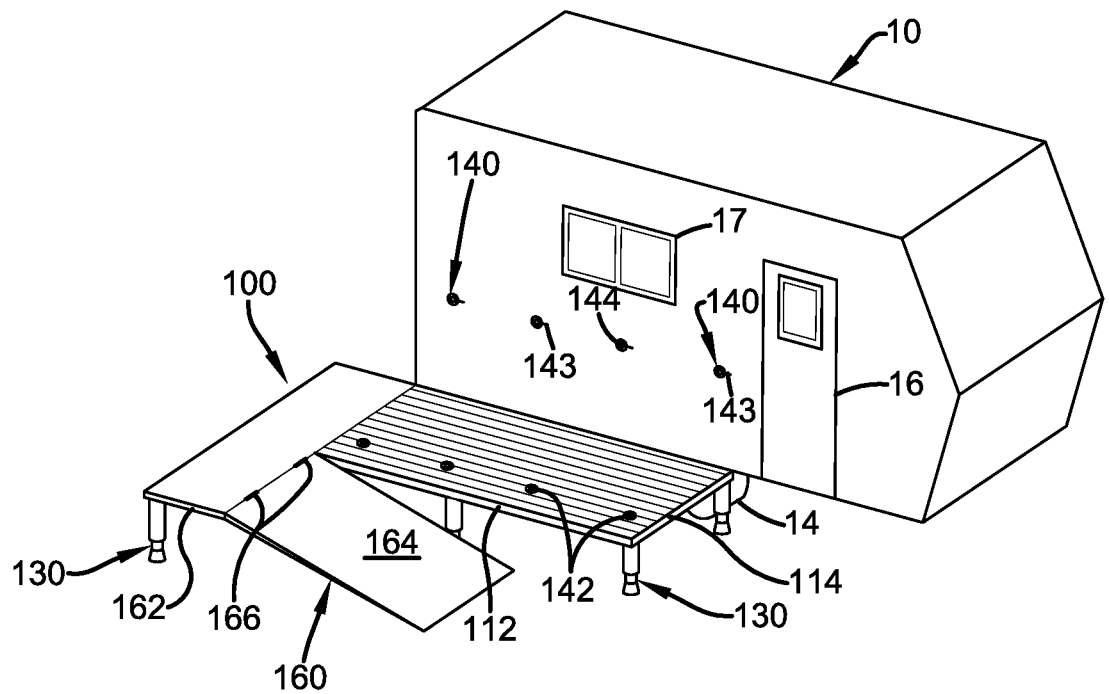
FIG. 3 illustrates a perspective view of an alternative embodiment of the repositionable deck device of the present invention in a deployed position and repositionably and hingedly attached the side of a prior art camper, wherein an optional ramp is attached to the deck device in accordance with the disclosed architecture.

Frame 110 is preferably comprised of one or more spaced apart longitudinal frame members 112 and one or more spaced apart lateral or cross members 114 connected together at their various intersections with fasteners 170. More specifically, longitudinal frame members 112 may be wooden, metal or composite 2×4s or 2×6s and are generally positioned in spaced apart generally parallel fashion, preferably not further apart than 16" center on center. Likewise, lateral or cross frame members 114 may be wooden or aluminum 2×4s or 2×6s and are generally positioned in spaced apart and parallel fashion and connect longitudinal frame members 112 to one another via fasteners 170, in a generally perpendicular fashion, to form a generally rectangular frame 110, as best shown in FIGS. 1-3. Fasteners 170 may be any type of fastener known in the art for fixedly or removably attaching to articles together such as screw, nails, bolts and nuts, and the like.

Decking 120 is fixedly attached to a top side of frame 110, as best shown in FIGS. 1 and 3. More specifically, decking 120 may be comprised of a plurality of wooden, metal or composite planks positioned adjacent to one another and may be fixedly attached to a top side of longitudinal and lateral frame members 112, 114 via fasteners 170. A small gap may be left in between each of planks to allow for expansion and to permit water to drain therebetween. Nonetheless, it is also contemplated that decking 120 may be comprised of a plurality of planks interconnected to one another in a tongue and groove fashion.

Decking 120 is preferably further comprised of a top surface 122, an inboard end 124, an outboard end 126 and one of more openings 128 formed therein for receipt of awning posts 19, as explained more fully below. As a point of reference, inboard end 124 of decking 120 refers to the decking end immediately adjacent to the side panel 12 of camper 10, and outboard end 126 refers to the opposite end of decking 120, or that which is furthest from side panel 12 of camper 10. Additionally, decking 120 may run parallel, perpendicular, or any other orientation in relation to side panel 12 of camper 10, and the color of decking 120 may be customizable to suit user need and/or preference.

Notwithstanding the forgoing, the frame 110 and associated decking 120 can be any suitable size, shape, color and configuration as is known in the art without affecting the overall concept of the invention, provided that it accomplishes the above stated objectives. One of ordinary skill in the art will appreciate that the shape and size of the frame 110 and decking 120 and its various components as shown in the various FIGS. are for illustrative purposes only, and that many other shapes, sizes and configurations of the frame 110 and decking 120 are well within the scope of the present disclosure. Although dimensions of the frame 110 and decking 120 and its components (i.e., length, width, and height) are important design parameters for good performance, the frame 110 and decking 120 may be any shape or size that ensures optimal performance during use and/or that suits user need and/or preference.

Figure 5:
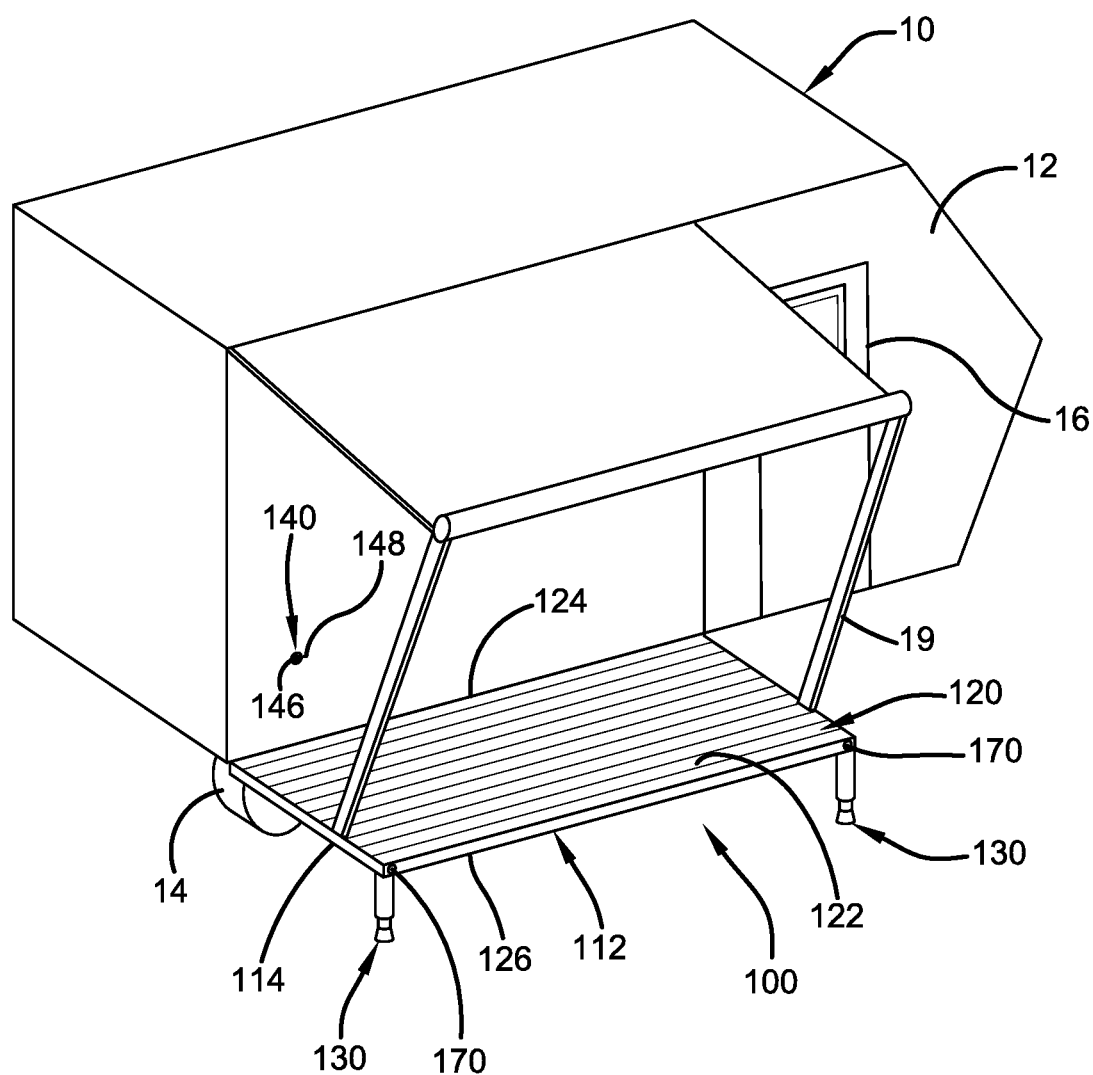
FIG. 5 illustrates a perspective view of one possible embodiment of the repositionable deck device of the present invention in a deployed position and repositionably and hingedly attached the side of a prior art camper and partially supporting a prior art awning system of the camper in accordance with the disclosed architecture.

As previously stated and best shown in FIGS. 1, 3 and 5, one or more legs 130 are fixedly attached to the underside of frame 110 and extend downwardly therefrom to reach a ground surface (not shown) for purposes of supporting repositionable deck device 100 when it is in a deployed position, as shown in FIG. 1. More specifically, each of legs 130 may be attached via hinges 132 to longitudinal frame members 112 and/or lateral frame members 114 in spaced apart fashion. Further, each of legs 130 are preferably telescoping and adjustable in nature to allow the user to customize the length of each of legs 130 to make sure that each leg 130 extends fully to and engages with the ground, thereby fully supporting repositionable deck device 100 when in the deployed position. More specifically, the telescoping style legs 130 may be comprised of a fixed section and a telescoping section extending outwardly from the fixed section. It is contemplated that the legs 130 may be comprised of a durable metal such as steel, or a lightweight yet sturdy alternative such as aluminum. Further, because legs 130 are hingedly attached to frame 110, they may be folded inwardly towards the frame 110 when not in use, such as when repositionable deck device 100 is in the stowed position, as best shown in FIG. 2.

Each of absorber assemblies 140 is preferably comprised of a separable clip assembly 142, an absorber component 144, an opening 146 in said absorber component 144 for receipt of clip assembly 142, and a lock 148. More specifically clip assembly 142 may be attached to the top surface 122 of decking 120 in a location and in such a manner so as to not create a tripping hazard. For example, clip assemblies 142 may be attached to the outboard end 126 of decking 120 so that it is not exposed to foot traffic. For each clip assembly 142, there is a corresponding absorber component 144 fixedly attached to side panel 12 of camper 10. Absorber component 144 is preferably a rubber grommet like device with opening 146 formed therein for receipt of clip assembly 142 when deck device 100 is in the stowed position, and lock 148 secures deck device 100 in said stowed position, for example, as camper 10 is being transported to and from the campsite. More specifically, absorber component 144 prevents or at least reduces the likelihood of damage being caused to decking 120 and/or side panel 12 of camper 10 from the vibrations caused as camper 10 is being transported.

As previously stated, repositionable deck device 100 further comprises a plurality of spring loaded hinges 150 that are used to attach frame 110 and decking 120 to the side panel 12 of camper 10. More specifically, spring loaded hinges 150 are preferably positioned along the inboard most longitudinal member 112 of frame 110 in spaced apart fashion, and hingedly attached to the side panel 12 of camper 10 via a plurality of fasteners 170. Importantly, the positioning of spring loaded hinges 150 and the overall dimensions of decking 120 should be such that (a) the top surface 122 of decking 120 is generally the same elevation as the entrance way to the camper 10 via door 16 when the deck device 100 is in a deployed position to prevent tripping and to make the same accessible to, for example, a wheelchair (not shown), and (b) the deck device 100, when in the stowed position, does not interfere with the user's use of door 16, window 17, the rotation of tires 14 or the operation of awning 18. Additionally, because the hinges 150 are spring loaded, a user (not shown) can easily reposition the deck device 100 from the deployed position shown in FIG. 1 to the stowed position shown in FIG. 2 with relatively minimal effort and despite its weight.

As stated above, in a preferred embodiment, the repositionable deck device 100 of the present invention further comprises a ramp 160 that leads from the ground surface to the top surface 122 of decking 120. Ramp 160 is preferably comprised of a ramp frame 162, ramp decking 164 and one or more hinges 166. Ramp frame 162 is similar to frame 110, and may be comprised of a plurality of longitudinal and lateral frame members (not shown) interconnected to one another via fasteners 170. Similarly, ramp decking 164 may be attached to ramp frame 162 via a plurality of fasteners 170. Each of ramp frame 162 and ramp decking 164 may be comprised of a composite material, wood, metal, or any other suitable material, preferably weather resistant.

Figure 4:
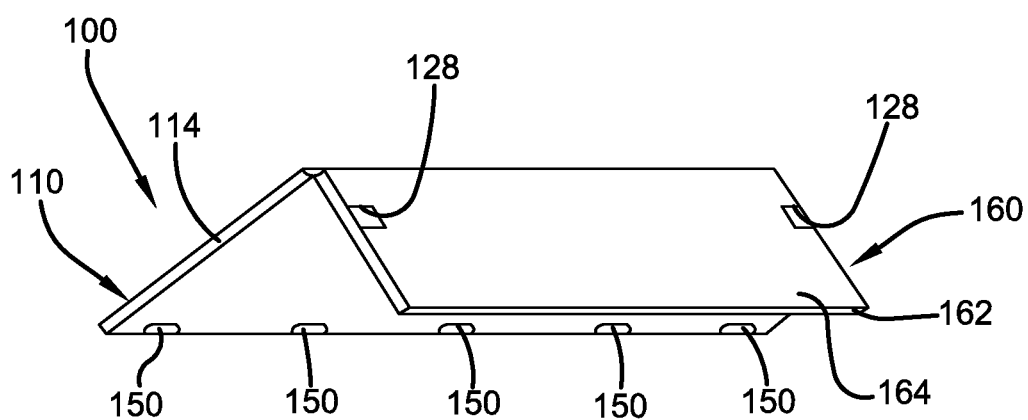
FIG. 4 illustrates a perspective view of one possible embodiment of the deck portion of the repositionable deck device of the present invention in a partially deployed position with an optional ramp portion repositionably and hingedly attached thereto in accordance with the disclosed architecture.

Additionally, ramp 160 may be repositionable and removably attached to frame 110 via geared hinges 166 anywhere along its perimeter, with the exception on the inboard end 124 which is obviously pre-occupied by side panel 12 of camper 10. For example, FIG. 3 illustrates a perspective view of ramp 160 hingedly attached to one end of the deck device 100, and FIG. 4 illustrates a perspective view of ramp 160 repositionably and hingedly attached to outboard end 126 of decking 120.

Now that a few of the possible embodiments of the repositionable deck device 100 of the present invention have been described, its use will be described in general terms. A user, having found a suitable location to set up camp for his or her camper 10 with repositionable deck device 100 attached to the side panel 12 thereof in a stowed position, will simply unlock the lock 148 on absorber assembly 140 and remove the clip assemblies 142 from openings 146 by gently pulling down and outwardly on the outboard end 126 of decking 120. As the frame 110 and decking 120 is being rotationally lowered into the deployed position shown in FIG. 1 about hinges 150, the weight of the frame 110 and decking 120 is partially supported by the bias in spring loaded hinges 150 so as to not put too much strain on the user. Further, the user can adjust and rotate outwardly each of the telescoping legs 130 so that they fully extend from the frame 110 to the ground surface. It will be appreciated that the various telescoping legs 130 may be of differing lengths to accommodate an uneven ground surface. Once the deck device has been fully deployed as best illustrated in FIG. 1, optional ramp 160 may be unfolded or reattached to decking 120 via hinges 166 and fasteners 170. Further, a user desiring to also deploy awning 18 can insert awning posts 19 in the pockets or openings 128 in decking 120 to support the cantilevered section of the awning. Additionally, a user desiring to close his or her camp and return home would simply complete the forgoing steps in reverse order, being sure to return the repositionable deck device 100 to the stowed position, as best shown in FIG. 2, and lock the absorber assembly 140 with locks 148.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A repositionable deck device for a structure having a side panel comprising:
    a frame;
    a decking attached to said frame;
    at least one leg extending between the frame and a ground surface;
    an absorbing mechanism, wherein the absorbing mechanism is comprised of a clip, a rubber grommet and a lock; and
    a hinge attached to said side panel and the frame for repositioning the deck device from a stowed position to a deployed position.

2. The repositionable deck device of claim 1, wherein the hinge is a spring loaded hinge.

3. The repositionable deck device of claim 1, wherein the at least one leg is telescoping and hingedly attached to the frame.

4. The repositionable deck device of claim 1, wherein the absorbing mechanism is positioned between the decking and the side panel when the deck device is in the stowed position.

5. The repositionable deck device of claim 1, wherein the decking is substantially parallel and adjacent to the side panel when the deck device is in the stowed position.

6. The repositionable deck device of claim 1, wherein the decking is substantially perpendicular to the side panel when the deck device is in the deployed position.

7. The repositionable deck device of claim 1 further comprising a ramp portion.

8. The repositionable deck device of claim 7, wherein the ramp portion is hingedly attached to the frame.

9. The repositionable deck device of claim 7, wherein the ramp portion extends between a top surface of the decking and a ground surface at an angle.

10. The repositionable deck device of claim 1, wherein the decking further comprises a pocket for receipt of an awning post.

11. A repositionable deck device for a structure having a side panel, wherein the repositionable deck device comprises:
    a frame comprised of longitudinal members and lateral members;
    a decking attached to said frame;
    a plurality of telescoping legs each extending between the frame and a ground surface;
    an absorbing mechanism, wherein the absorbing mechanism is comprised of a clip, a rubber grommet and a lock;
    a hinge attached to said side panel and the frame; and
    a ramp.

12. The repositionable deck device of claim 11, wherein the decking is repositionable between a stowed position and a deployed position.

13. The repositionable deck device of claim 11, wherein the decking is rotatable about the hinge relative to the side panel.

14. The repositionable deck device of claim 11, wherein the hinge is a spring loaded hinge.

15. The repositionable deck device of claim 11, wherein the absorbing mechanism is positioned between the decking and the side panel when the deck device is in the stowed position.

16. The repositionable deck device of claim 1, wherein the decking is substantially perpendicular to the side panel when the deck device is in the deployed position.

* * * * *